United States Patent Office 3,062,035
Patented Nov. 6, 1962

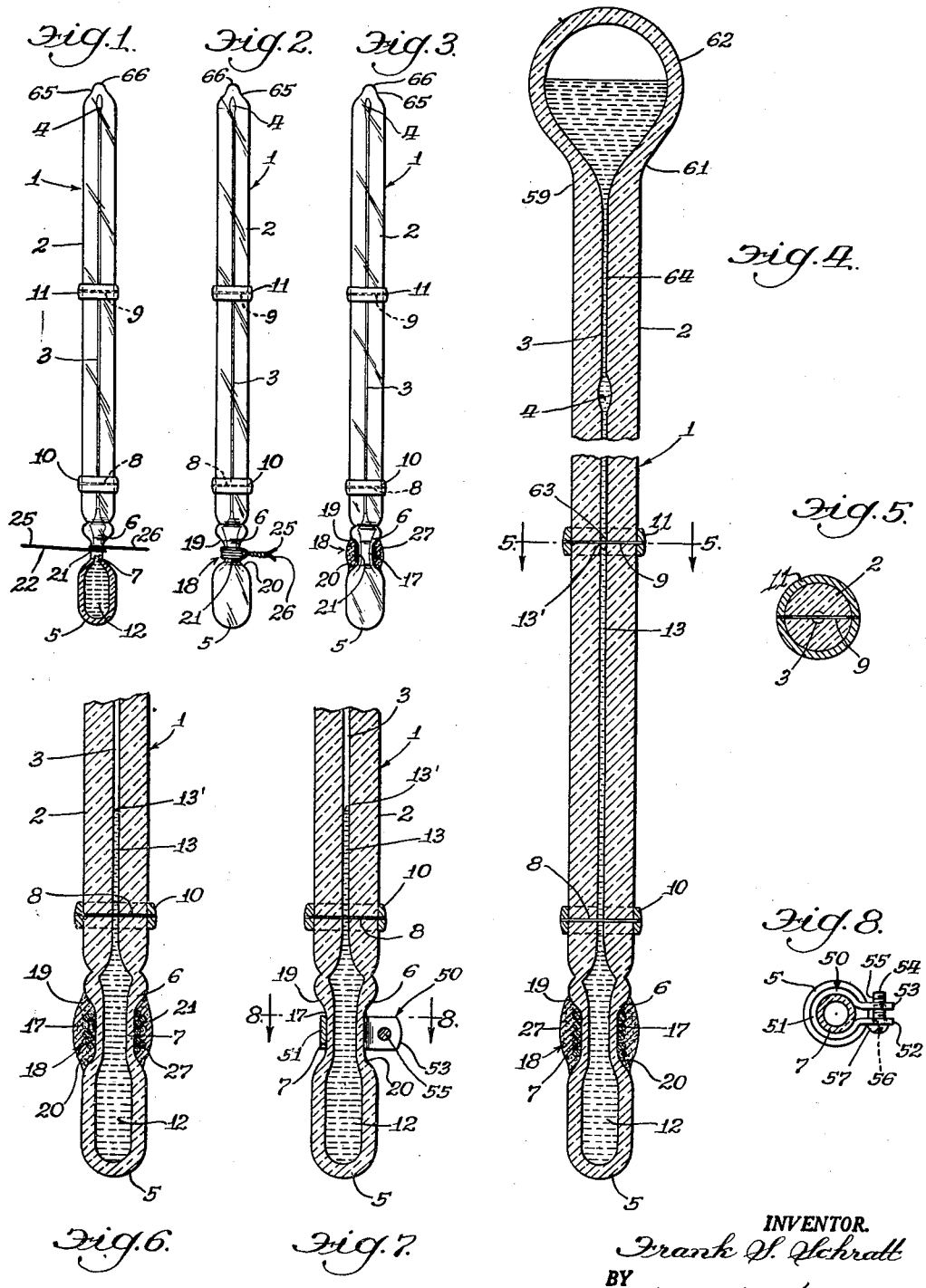

3,062,035
THERMOMETER AND METHOD OF MAKING AND CALIBRATING THE SAME
Frank S. Schratt, 9741 Elms Terrace, Des Plaines, Ill.
Filed Jan. 18, 1960, Ser. No. 3,063
12 Claims. (Cl. 73—1)

This invention relates to thermometers and to a process of making and accurately calibrating thermometers.

In the art of making thermometers considerable difficulty is experienced in accurately calibrating thermometers and the number of rejects is frequently extensive. A very high degree of skill is required according to the present practice and methods now used are demanding of experienced workmen and are very time consuming so that the product, even if reasonably accurate, is quite expensive.

It is a general object of the invention to provide a novel means and method for salvaging such rejected thermometers and which obtains an exceptionally high degree of accuracy.

A further object of the invention is to provide such means and process which may be easily and readily incorporated as a manufacturing practice.

A different object of the invention is to provide novel means which compensates for the initial inaccuracy in the thermometer calibration.

A more specific object is to provide a compensating means which may be easily manipulated to effect the desired correction in reading on the thermometer.

The invention comprehends the provision of a novel compensating means in the form either of a wire wrapping or adjustable clamp which functions to compress, preferably the bulb portion of the thermometer, the tension of the wrapping or the hoop tension of the clamp being selectively adjustable in accordance with the actual requirements as determined by a calibrated test bath.

These and other objects and advantages inherent in and encompassed by the invention will become more readily apparent from the specification and the drawings, wherein:

FIGURES 1, 2 and 3 are side elevational views, FIGURES 1 and 3 being partially in axial section of a thermometer being processed according to the invention using one form of compensating means.

FIGURE 4 is an enlarged axial sectional view of a thermometer in the initial stages of manufacture and particularly showing the reservoir chamber prior to sealing of the upper end of the thermometer stem;

FIGURE 5 is a cross-section on line 5—5 of FIGURE 4;

FIGURE 6 is a fragmentary enlarged sectional view particularly illustrating the bulb portion and compensating winding;

FIGURE 7 is a view similar of FIGURE 6 showing a compensating clamp device, and

FIGURE 8 is a cross-sectional view on line 8—8 of FIGURE 7.

Describing the invention in detail and having particular reference to the drawings, there is shown in FIGURES 1–6 a thermometer generally indicated 1 comprising a stem or tube portion 2 which is of relatively thick section with a small diameter axial bore 3 communicating at its upper end with an enlarged expansion chamber 4 and at its lower end with a reservoir provided by the bulb 5 which is connected in end to end relation with the stem.

The bulb is normally of thinner section than the stem but I prefer to neck or taper the bulb at 6 and reduce the section thereat as indicated at 7 to enhance the flexibility of this portion of the bulb.

As best seen in FIGURE 4, there are provided along the length of the stem two electrodes or contacts 8 and 9 which extend into the bore 3 tangentially thereto and which are connected to contact rings 10 and 11 respectively which encircle the stem and provide connections for leads from associated apparatus as well known to those skilled in the art.

It will be noted that in the thermometer herein shown it is essential that the upper electrode 9 be located at an exact temperature location as is desired. For example, if the mercury designated 12 is to expand so that its column 13 in the bore 3 must contact the upper electrode 9 at the preset temperature, such as say 100° F., then its location on the stem should theoretically be relatively simple to calculate. However in actual practice this is almost impossible to do since various factors contribute to the elevation of the mercury such as the coefficient of friction of the glass (no two being exactly alike) differences in the diameters of the bore, any constrictions in the bore as well as the purity of the mercury itself. Also what normally would appear to be immaterial variations in each step of manufacture may effect the action and position of the top 13' of column 13.

The device herein shown presupposes that the mercury column 13 reads low with respect to the upper electrode 9 at the rated temperature value. In order to correctly calibrate such thermometer each one, whether to be re-calibrated or not is preferably, though not necessarily, necked down to provide an intermediate portion at 6 of reduced diameter on the bulb 5 which has a relatively thin wall section at 7 and also provides a peripheral groove 17 within which is retained a compressing or compensating means generally designated 18 which is prevented endwise or axial displacement on the bulb through abutment with the shoulders 19 and 20.

In the present instance as shown in FIGURES 1–6, the compensating means comprises one or more loops or turns 21, 21 of wire 22 which is wrapped about the portion 6 under suitable tension deflecting the sensitive or relatively highly flexible thin wall portion 7 inwardly a sufficient amount to elevate the mercury column 13 through displacement of the mercury in the reservoir or bulb 5 to the level commensurate with the rated requirement. The number of turns and the tautness of the loops must be gained experimentally not only with each thermometer but also with different kinds (dimensionally different etc.) of thermometers. As indicated previously, although the thermometers of any one group may be similar they are not identical. Therefore in practice it is necessary to test each thermometer individually and by selective incremental adjustment of the compressive load upon the bulb with intermittent dipping or suspension of the thermometer in a calibrated test bath the level of the column 13 is brought up to the desired location at the rated temperature.

It will be understood that in practice, the workman performs the operation upon thousands of similar units and after some experience he is able to gauge quite closely as to how many windings are required and at what tension before he twists the ends 25 and 26 to secure the wire on the bulb. The tighter the twist, the more compression on the deflectible portion. This additional twist may be performed after suspending the thermometer in the calibrated test bath if the reading is too low. If the reading is still too low additional twist is applied. If too high the tension is relieved by untwisting. The compression means or wire looping and twist is soldered to form a band 27 thereabout securing the compression means in place.

FIGURES 7 and 8 illustrate a modified form of the invention wherein parts identical to those of the previous embodiment are identified by the same reference numerals. In this embodiment the compression or adjusting means 50 is in the form of a clamp comprising a band 51 with a pair of outturned ears or lugs 52, 53 through which extends the bolt 54 which has a shank 55 threaded into ear 53 and extending through an aperture 56 in ear 52 and having a head 57 engaging the outer side of ear 52. In the instant form of the invention the compression or hoop tension in the clamp is varied by incremental adjustment of the bolt 54 as determined by reference to the position of the mercury column at the rated temperature after the thermometer has been tested in a test bath.

It will be understood that the shape and design of the bulb and the position and location as well as the form of the adjusting means as herein shown is only by way of explanation and disclosure and in no way to be construed as limiting the invention inasmuch as other means may be used to effect the same purpose and is well within the skill of those versed in the art.

It will be understood that in the process of making and calibrating the thermometer after the terminal wires 8 and 9 are affixed into the stem 3 and the bulb 5 connected to the lower end of the stem the mercury 12 is entered into the bulb and stem, a portion 59 of the stem extends above the expansion chamber 4. The portion 59 is heated at its upper end 61 to molten state and sealed and the entire structure inverted so that the mercury is caused to run into and form the reservoir bulb 62 which expands to receive part of the mercury in the bore 3 and bulb 5. The mercury has air entrapped therein which through heating of the bulb 5 is caused to ascend into the bore 3 in the form of a bubble 63 separating the column 13 from the column portion 64. The structure is then immersed into a bath which is maintained at a rated temperature. The workman notes the level of the bubble 63, and if it is below the electrode 9 he withdraws the structure from the bath and allows it to cool and then sharply vibrates the unit and quickly moves it downwardly and suddenly stops, thereby forcing and seeping part of the mercury column portion 64 past the bubble 63 and adding it to the column 13. The unit is again immersed with the bulb 5 into the test bath and if the upper end 13 of the column does not register with the upper electrode or indicia 9 at the rated temperature the process is repeated until the operator obtains a height in column 13 which at the rated temperature of the bath contacts the head end 13′ of the column 13 with the upper electrode 9. It will be noted that the bubble 63 is now at the level of the upper electrode 9. The bubble 63 forms a division between the lower and upper column portions. The operator at this time inverts the unit and drains the column portion 64 into the horn or reservoir chamber 62.

The stem 2 is then pinched off at 65 after being locally heated to molten state and the tube or stem is either vacuum closed or pressure closed at 66 as is well known to those skilled in the art.

The thermometer thus made is again tested and if it reads accurately is passed but if it reads too low, the operator then applies the compensating means to the bulb. In the first embodiment he wraps the wire about the bulb 5 in the groove 17 and twists the ends 25 and 26 and then tests the unit. If the reading is too low he twists the ends more. If still too low or if he had full twist initially he untwists the ends and wraps more windings about the bulb to obtain cumulative pressure and twists the ends. He tests again. If the reading is correct he solders the ring 27 thus completing the operation.

With the adjustable clamp 50, essentially the same procedure is applied. The thermometer is tested in the bath. The bolt 54 is incrementally tightened if after each test the reading is low until a correct reading is obtained. If too high the bolt 54 is backed off.

Having thus described several preferred forms of the invention it is to be understood that these are merely exemplary and that the scope of the invention is to be interpreted in accordance with the claims appended hereto.

What is claimed is:

1. In a thermometer of the type having a stem with temperature indicia thereon and a bulb connected to one end of the stem and said stem having a bore communicating with the bulb and a thermal sensitive medium in the bulb expandable into said bore and forming a temperature indicating column therein, the improvement comprising compensating means adjustable about the bulb in compressing relation thereto.

2. A thermometer structure comprising a stem and a bulb and said stem having a bore communicating with the bulb, mercury in the bulb ascendable into the bore upon heating, said stem having temperature gauge means thereon, and compensating means pressingly engaging said structure in deforming relation thereto and operative to vary the level of the mercury column in the bore to register the head of the column with said gauge means at rated temperature.

3. A method of calibrating a low reading thermometer of the type which has a stem and a bulb containing a thermal sensitive medium which moves as a column within a bore in the stem and registers against indicia on the stem, comprising the steps of subjecting the thermometer to a test bath of a preset temperature, then comparing the reading of the thermometer with the preset temperature, then compressing the bulb and holding compression on the bulb an amount sufficient to elevate the column to read in accordance with the preset temperature in registry with the corresponding indicia on the stem.

4. A method of calibrating a low reading thermometer which comprises a structure having a stem portion and a bulb portion containing a thermal sensitive medium which moves as a column in a bore in the stem portion and registers against indicia on the stem portion comprising the steps of exposing said thermometer to a calibrated test temperature corresponding to said indicia, then noting the difference between the reading on the thermometer and the calibrated temperature, and then compressing at least one of said portion and maintaining the compression thereon in an amount sufficient to move the column to register with the selected indicia at the calibrated temperature.

5. A thermometer comprising a stem portion having a longitudinal bore and a bulb portion at one end of the stem portion communicating with the bore, and a thermal sensitive medium in the bulb portion expansible into the bore to provide a temperature indicating column therein, and indicia on the stem portion adapted to register with the column, and compression means mounted upon the bulb in compressing relation thereto for elevating the column the amount of lag between the actual temperature and the indicated temperature.

6. The invention according to claim 5 and said compression means comprising at least one turn of wire having ends secured to each other and holding said wire under hoop tension against the bulb.

7. The invention according to claim 5 and said bulb having a pressure sensitive wall section opposing said compression means for ready deflection thereby.

8. The invention according to claim 5 and said bulb having a necked down portion providing a groove receiving said compression means therein.

9. The invention according to claim 5 and said compression means comprising a circumferentially adjustable hoop.

10. A thermometer having a stem portion with an axial bore, a bulb portion at one end of the stem portion, mercury or the like in the bulb portion expandable within the bore and forming a temperature indicating column, indicia on the stem portion registerable with the column, said indicia being calibrated to register with the head of the column in accordance with standard readings, and means mounted upon one of the portions in compressive relation thereto at a point influencing the height of the column and effective to raise the column attendant to increasing pressure against said point and lower the column upon reduction of pressure against said point.

11. A method of calibrating a thermometer of the type having a stem with an axial bore and a bulb at one end and a thermal responsive media in the bulb expandable as a column into the bore and the stem having indicia adapted to register with the top of the column to provide a temperature reading, the step comprising testing the thermometer for accuracy in its readings, then noting the difference between the head of the column and the correct indicia for the selected temperature reading, then if the reading is low applying a compressive load on the bulb by winding wire strand thereabout and twisting the ends of the strand to hold the strand with a hoop tension about the bulb, then testing the thermometer for accuracy by subjecting it to a calibrated test temperature then noting discrepancy between the indicated temperature reading and the test temperature, then if the reading is too high relieving pressure on the bulb by unwinding and readjusting the hoop tension of the strand and twisting the ends and continuing this operation until the reading on the thermometer corresponds to the test temperature and then permanently securing the ends.

12. A glass thermometer comprising a bulb and a stem with a bore communicating with the bulb, thermally responsive medium in the bulb expandable into the bore, said bulb having a tapered portion and a reduced portion, and compensating means embracing said bulb under a deforming pressure in a selected position on at least one of said portions.

References Cited in the file of this patent
UNITED STATES PATENTS

| | | |
|---|---|---|
| 489,259 | Maxim et al. | Jan. 3, 1893 |
| 695,262 | Zeal | Mar. 11, 1902 |
| 2,158,146 | Parks | May 16, 1939 |
| 2,894,393 | Koelle | July 14, 1959 |